(12) United States Patent
Lee

(10) Patent No.: US 6,889,386 B2
(45) Date of Patent: May 3, 2005

(54) APPARATUS FOR PROCESSING DATA OF PROGRAM GUIDE

(75) Inventor: Jung Hye Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 878 days.

(21) Appl. No.: 09/760,839

(22) Filed: Jan. 17, 2001

(65) Prior Publication Data

US 2001/0009034 A1 Jul. 19, 2001

(30) Foreign Application Priority Data

Jan. 17, 2000 (KR) .......................................... 2000-2066

(51) Int. Cl.[7] ................................................ H04N 7/16
(52) U.S. Cl. ...................................... 725/142; 725/39
(58) Field of Search .......................... 386/83; 348/714; 725/39, 54, 68, 142, 134; 375/240.01, 240.26, 240.29; 370/503, 465, 442, 347

(56) References Cited

U.S. PATENT DOCUMENTS

| | | | | |
|---|---|---|---|---|
| 5,459,789 A | * | 10/1995 | Tamer et al. ................ | 380/241 |
| 5,515,106 A | * | 5/1996 | Chaney et al. ................ | 725/48 |
| 5,625,693 A | * | 4/1997 | Rohatgi et al. ............. | 713/187 |
| 5,642,153 A | * | 6/1997 | Chaney et al. ................ | 725/40 |
| 6,091,772 A | * | 7/2000 | Anderson et al. ....... | 375/240.26 |
| 6,604,243 B1 | * | 8/2003 | Freimann .................... | 725/131 |
| 6,654,423 B2 | * | 11/2003 | Jeong et al. ........... | 375/240.29 |
| 6,658,661 B1 | * | 12/2003 | Arsenault et al. ............ | 725/54 |
| 6,665,870 B1 | * | 12/2003 | Finseth et al. ................ | 725/40 |

* cited by examiner

*Primary Examiner*—John Miller
*Assistant Examiner*—Scott Beliveau
(74) *Attorney, Agent, or Firm*—Birch, Stewart, Kolasch & Birch, LLP

(57) ABSTRACT

A program guide data processing apparatus which can effectively use a frame_filter by effectively combining SCIDs of an SCID_filter (corresponding to the conventional PID_filter) and frame_headers of a frame_filter (correponding to the conventional section_filter), and which can reduce the size of a buffer for storing APG data by effectively using the buffer. The apparatus has the feature that the SCID_filter (PID_filter) and the frame_filter (section_filter) are in a multi-to-multi correspondence by providing at least one SCID corresponding to a respective header of the frame_filter, and the size of the buffer for storing the APG data is '(the number of APG_SCIDs)*(the size of the buffer set by a user: the minimum size whereby the buffer is not in full)'.

7 Claims, 4 Drawing Sheets

FIG.3

| | SCID_number (5 bits) | SCID_number (5 bits) | SCID_number (5 bits) | SCID_number mask_bits (3 bits) |
|---|---|---|---|---|
| frame_header 0 | ex)0×0 | ex)0×1 | — | — |
| frame_header 1 | ex)0×1 | ex)0×2 | — | — |
| frame_header 2 | ex)0×0 | ex)None | ex)None | — |
| frame_header 3 | ex)0×2 | ex)None | ex)None | — |
| frame_header 4 | ex)0×2 | ex)0×3 | ex)None | — |

...

| | SCID_number (5 bits) | SCID_number (5 bits) | SCID_number mask_bits (3 bits) |
|---|---|---|---|
| frame_header 30 | ex)0×7 | ex)0×15 | — |
| frame_header 31 | ex)0×14 | ex)0×15 | ex)0×1a |

FIG.4

| | 31 | 30 | 29 | | 5 | 4 | 3 | 2 | 1 | 0 |
|---|---|---|---|---|---|---|---|---|---|---|
| scid0 | 0 | 0 | 0 | ..... | 1 | 0 | 0 | 1 | 0 | 1 |

| | 31 | 30 | 29 | | 5 | 4 | 3 | 2 | 1 | 0 |
|---|---|---|---|---|---|---|---|---|---|---|
| scid1 | 0 | 0 | 0 | ..... | 0 | 0 | 0 | 0 | 1 | 1 |

$\vdots$

| | 31 | 30 | 29 | | 5 | 4 | 3 | 2 | 1 | 0 |
|---|---|---|---|---|---|---|---|---|---|---|
| scid30 | 0 | 0 | 0 | ..... | 0 | 1 | 0 | 0 | 1 | 0 |

| | 31 | 30 | 29 | | 5 | 4 | 3 | 2 | 1 | 0 |
|---|---|---|---|---|---|---|---|---|---|---|
| scid31 | 0 | 0 | 0 | ..... | 1 | 0 | 0 | 0 | 0 | 1 |

FIG.5

| Frame_start_point (start address of buffer) | Frame_start_point (end address of buffer) | Matched SCID_number | Matched frame_header _number |
|---|---|---|---|

APPARATUS FOR PROCESSING DATA OF PROGRAM GUIDE

BACKGROUND OF THE INVENTION

1. Field of the Invention

The present invention relates generally to a digital broadcasting, and more particularly to an apparatus for processing program guide data.

2. Description of the Related Art

In a digital broadcast video and audio streams are compressed into digital information to be broadcast, and system information and program information are compressed in accordance with the program and system information protocol (PSIP) standard to be broadcast.

The PSIP is the ATSC standard for terrestrial and cable digital broadcasting, wherein an electrical program guide and system information are defined as one information. That is, the PSIP is defined to provide diverse information on programs by parsing messages encoded by MPEG-2 system (Moving Picture Experts Group; ISO/IEC 13818-1 system) (1977 December., Document A/65).

Specifically, the PSIP includes several tables so that it can transmit/receive audio/video (A/V) data prepared in an AC-3 audio format and in an MPEG-2 video format, respectively, and transmit information on channels of respective broadcasting stations and information on respective programs of the channels.

As described above, the PSIP supports a primary function of providing an A/V service of a desired broadcasting program of a selected channel, and a supplementary function of providing an electronic program guide (EPG) for a broadcasting program, i.e., a broadcasting program guide service. At this time, channel information for channel selection and information such as a packet identifier (PID) for receiving the A/V signal are transmitted through a virtual channel table (VCT), and EPG information of broadcasting programs of respective channels are transmitted through an event information table (EIT), respectively.

The EIT includes information on events of the virtual channel (i.e., such as title, start time, etc.), and one event is a typical television program. The PSIP includes 4 EITs at minimum, and 128 EITs at maximum, and the respective EIT provides event information for a specified period of time.

As described above, the electronic program guide (EPG) for displaying information on a televised program in a digital television (TV) receiver has various presentation types through a table where a plurality of sections are combined for the convenience in interface with a user.

One among the well-known electronic program guide (EPG) types is the Gemster table type.

Also, the digital satellite system (DSS) of DIRECTV, that has the highest market share among the United States satellite broadcasting systems, serves an APG (Advanced Program Guide) that is higher than the existing EPGs in level. Accordingly, the development of a transport demultiplexer (TP) for effectively processing the APG data has been pressed.

Now, the operation of the conventional TP structure for processing the PSI of MPEG, which has the similar structure and contents to the APG, will be explained.

The above-described TP filters the PSI data inputted in the unit of a packet through a PID_filter and a section_filter. At this time, one section_header is mapped to one PID (one PID may be mapped to various section_headers).

The data having passed the filter is stored, being classified according to kinds of section_headers set in a section_filter, and thus buffers are provided as many as the number of the section_headers that can be set.

In this case, the size of the respective buffer should be at least twice the maximum length of the section.

The conventional TP structure as shown in FIG. 1, however, has the following problems.

For convenience' sake, the TP that can set 32 PIDs and 32 section_headers is shown.

First, since it is generally possible to masking the section_filter, only a portion of fields of the section_headers can be actually set. Thus, one set section_header can be combined with several PIDs.

That is, the section matches the PID 0, PID 1, or PID 2, and the filtering may be performed only when the matched PID matches the header 0 of the section_filter.

However, according to the structure of the conventional data processing apparatus, since only one PID matches one section_header, the section_header 0 having the same PID_filter matches the PID 0, PID 1, and PID 2 of the PID-filter one by one, and thus three section_headers should be set in total. This results in that only 29 headers among 32 headers remain to be set.

As described above, according to the conventional TP, since the section_header matches only one PID even if the TP has a memory that enables 32 headers to be set, this causes 32 memories not to be used in full if the header value is set twice or more. However, since various kinds of objects are inputted to the APG, the kinds of frame_headers to be set become great, and thus it is difficult that the frame filter performs its own function well.

Second, since the number of buffers for storing the PSI data should be always equal to that of headers of the section_filter, the size of the buffer becomes massive.

In this case, the size of the buffer becomes 32× (i.e., the size determined by the user: the minimum size whereby the buffer becomes not in full), and this causes a stumbling block in reducing the size of hardware.

As a result, the conventional program guide data processing apparatus has the following disadvantages.

First, since one section_header matches only one PID, the memory for setting the headers cannot be used in full.

Second, since the number of buffers for storing the PSI data is always equal to the number of headers of the section_filter, the total size of the buffer becomes massive, and it is difficult to reduce the size of hardware.

SUMMARY OF THE INVENTION

Accordingly, the present invention is directed to an apparatus for processing data of a program guide that substantially obviate one or more of the problems due to limitations and disadvantages of the related art.

An object of the present invention is to provide a program guide data processing apparatus which can effectively use a frame_filter by effectively combining SCIDs of an SCID_filter (corresponding to the conventional PID_filter) and frame_headers of a frame_filter (correponding to the conventional section_filter).

It is another object of the present invention to provide a program guide data processing apparatus which can reduce the size of a buffer for storing APG data by effectively using the buffer.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the program guide data processing apparatus has the feature that the SCID_filter (PID_filter) and the frame_filter (section_filter) are in a multi-to-multi correspondence, and at least one SCID corresponding to a respective header of the frame_filter is provided in order to set the multi-to-multi correspondence.

The program guide data processing apparatus includes an SCID_filter section including a plurality of SCIDs for receiving A/V data provided in an A/V signal format, a frame_filter section, composed of a plurality of headers, for being mapped on the SCID-filter section in a multi-to-multi correspondence so that at least one of the headers corresponds to the plurality of SCIDs, and a memory section for forming a buffer for each of the SCIDs, and storing program guide data in the unit of a frame.

Preferably, the size of a buffer for storing APG data is '(the number of APG_SCIDs)*(the size of the buffer set by a user: the minimum size whereby the buffer is not in full)'.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 3 is a view illustrating an example of a register which represents the matching between an SCID_filter and a frame_filter according to the present invention.

FIG. 4 is a view illustrating another example of a register which represents the matching between an SCID_filter and a frame_filter according to the present invention.

FIG. 5 is a view illustrating the construction of a register read by a host when APG data is transmitted to a buffer according to the present invention.

DETAILED DESCRIPTION OF THE PREFERRED EMBODIMENT

Reference will now be made in detail to the program guide data processing apparatus according to the preferred embodiment of the present invention, examples of which are illustrated in the accompanying drawings.

Figure 1:
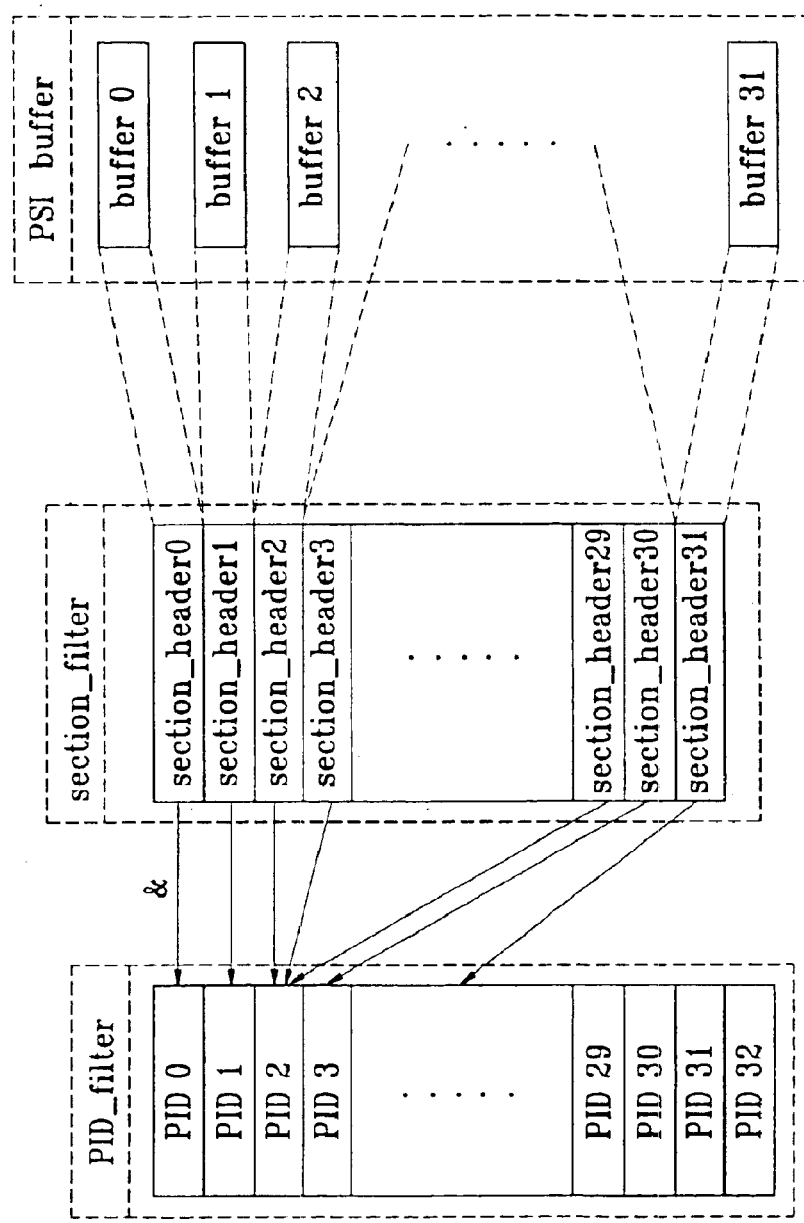
FIG. 1 is a view illustrating a conventional program guide data processing apparatus.
Figure 2:
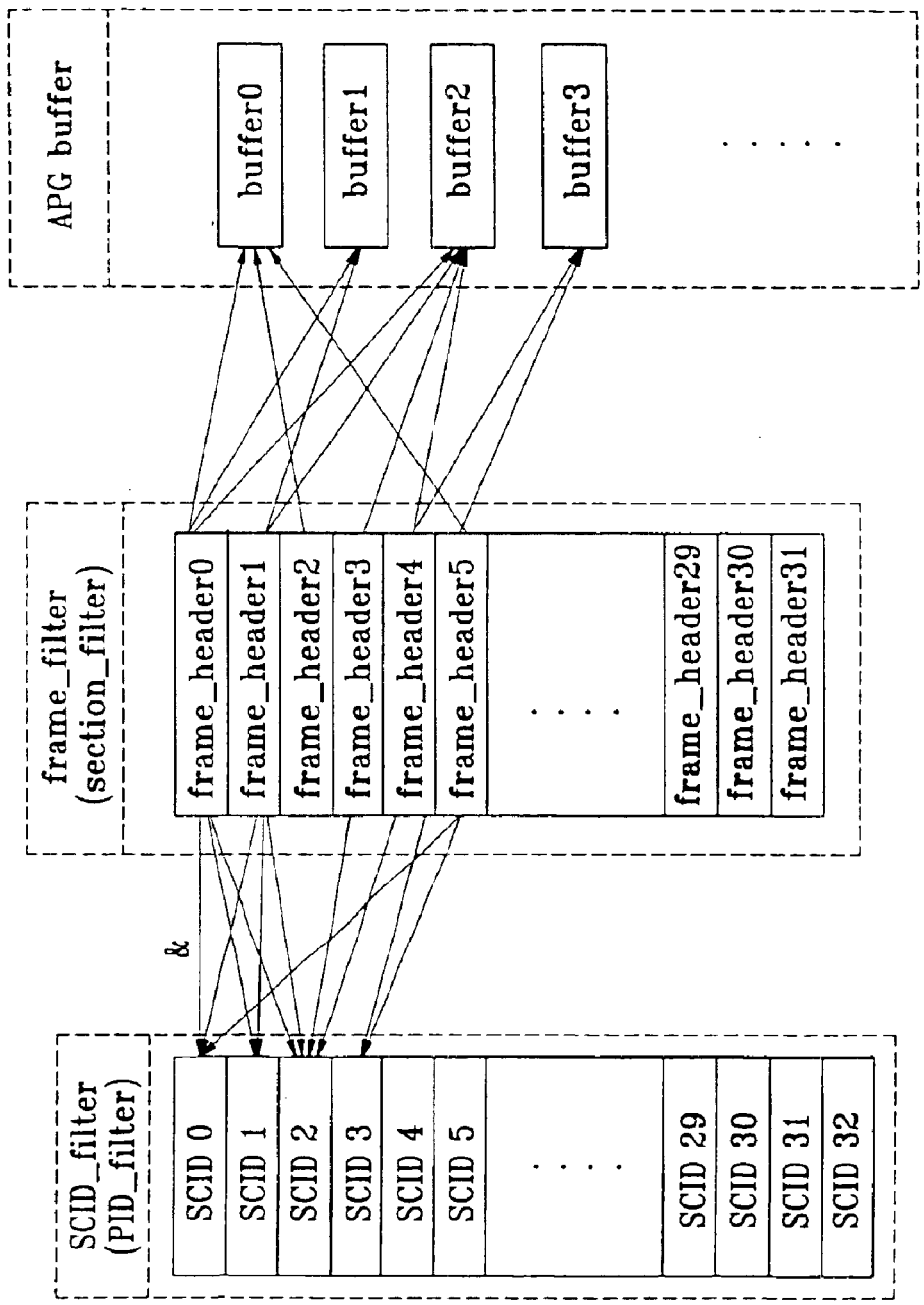
FIG. 2 is a view illustrating a program guide data processing apparatus according to the present invention.

FIG. 2 is a view illustrating a program guide data processing apparatus according to the present invention.

The program guide data processing apparatus of the present invention includes an SCID_filter section including a plurality of SCIDs for receiving A/V data provided in an A/V signal format, a frame_filter section, composed of a plurality of headers, for being mapped on the SCID-filter section in a multi-to-multi correspondence so that at least one of the headers corresponds to the plurality of SCIDs, and a memory section for forming a buffer for each of the SCIDs, and storing program guide data in the unit of a frame. The respective header in the frame_filter section includes a frame_header section for representing an inherent value of the corresponding header, an SCID_number section having at least one SCID set in the respective frame_header section, and a mask section for selecting a mask of the corresponding header.

FIG. 3 is a view illustrating an example of a register which represents the corresponding relation between an SCID_filter and a frame_filter according to the present invention.

Referring to FIG. 2, the SCIDs of the SCID_filter and frame_headers of the frame_filter are mapped in a many-to-many correspondence.

On the basis of the frame_filter, the frame_header 0 (i.e., section_header 0) corresponds to SCID 0, SCID 1, and SCID 2. Thus, as shown in FIG. 3, the SCID_number of the frame_header 0 is set with 0×0, 0×1, and 0×2.

The frame_header 1 to frame_header 31 are also set in the same manner as above. Here, only the frame_header 0 is considered.

According to the conventional apparatus, since the frame_header 0 corresponds to SCID 0, SCID 1, and SCID 2, respectively, through three times settings, the kinds of the set frame_headers actually becomes smaller even though the frame_filter having the same size is used.

Also, since various kinds of objects (i.e., kinds of tables in concept) are inputted to the APG, the kinds of frame_headers to be set become great, and thus in case of conventionally implementing the APG, it is difficult that the frame filter performs its own function well.

Meanwhile, it can be defined according to the existing condition how many SCID_numbers are prepared in one frame_header.

As described above, the SCID_filter (PID_filter) and the frame_filter (section_filter) are in a multi-to-multi correspondence, and at least one SCID corresponding to the respective header of the frame_filter is provided in order to set the multi-to-multi correspondence. At this time, if the SCID value is set, 12 bits are required for each SCID, and thus the order set in the SCID_filter, i.e., the number of the SCID register, can be written instead of the set value.

For example, if it corresponds to the SCID set in the SCID_register 3, 3 is set. Accordingly, if the frame_filter corresponds to 32 SCIDs, only five bits are allocated for each SCID.

As described above, the register for setting the matching relation between the SCID_filter and the frame_filter sets the index matched to the SCID on the basis of the frame_filter as a figure. However, it may be more preferable that the index is set by matching the frame_header on the basis of the SCID_filter, not on the basis of the frame_filter.

That is the reason why the SCID filtering is performed prior to the frame filtering.

At this time, by representing the index as a bit map rather than directly writing the index in the register, more diverse matching relations can be represented with a smaller-sized register.

According to another embodiment as explained later, the index matched to the frame_header on the basis of the SCID_filter is set as a 32-bit bit map.

In detail, the SCID_filter can be constructed as shown in FIG. 4. Referring to FIG. 4, the SCID_filter includes a plurality of SCIDs indicating inherent values of the corresponding SCIDs, and a 32-bit bit map matched to at least one frame_header. The 32-bit bit map is set at a position matched to in the order of the frame_headers.

Accordingly, in a set case such as SCID 0, the frame_filters 0, 2, and 5 are matched to the SCID 0. Thus, data that has passed one of the frame_filters 0, 2, and 5 among data having passed the SCID 0 in the SCID_filters will be the final data.

Next, the storage of the APG data in the buffer will be explained.

The TP should transmit the APG data in the unit of a frame, being classified by SCIDs and frame_headers.

According to the conventional apparatus, a separate buffer is employed for each SCID and frame_header. On the contrary, according to the present invention, in order to reduce the size of the buffer, the matched SCID number and frame_header number are written in the register read by the host when the APG data is transmitted, instead of employing the separate buffers.

The structure of the register is illustrated in FIG. 5.

Meanwhile, another frame does not start before one frame is completed in one SCID. However, another frame may start before one frame is completed if the frames have different SCIDs.

Accordingly, a buffer is allocated for each SCID, and the required size of the buffer becomes 'the number of APG_SCIDs)*(the size of the buffer set by the user: the minimum size whereby the buffer is not in full)'.

When the arrival of the frame is recognized, the SCID that matches the frame and the register number of the frame_header are also recognized along with a frame_start_point, and a frame_end_point.

Now, the operation of the program guide data processing apparatus according to the present invention as constructed above will be explained in detail with reference to the accompanying drawings.

As shown in FIG. 2, the frame_header 0 to frame_header 5 correspond to the SCID 1 to SCID 3 in a multi-to-multi manner. Since the number of the corresponding SCIDs are 4 at maximum, the size of the buffer becomes '4*(the minimum size whereby the buffer is not in full)'.

Specifically, 4 SCID registers, 6 frame_header registers, and 4 buffers whose size is '4*(the minimum size whereby the buffer is not in full)' are required. However, in implementing this by the conventional structure, 4 SCID registers, 11 frame_header registers, and 11 buffers whose size is '11*(the minimum size whereby the buffer is not in full)' are required. This requires the settings of the frame_headers and separate buffers as many as the number of arrows shown in FIG. 2.

Accordingly, in implementing the frame_filter in the same manner, the structure according to the present invention can reduce the number of the frame_header registers and the size of the buffer in comparison to the conventional structure.

As described above, the program guide data processing apparatus according to the present invention has the following advantages.

First, the size of the frame_filter and buffer can be reduced.

Second, since more kinds of frame_headers can be filtered in case of using a frame_filter having the same size, the performance can be improved in case of the APG having much more kinds of frame_headers.

Third, the apparatus can be applied to the TP for processing different EPG data.

Fourth, in case that a section_filtering is performed in the TP, the size of the section_filter and buffer can be reduced by applying the present invention thereto.

While the present invention has been described and illustrated herein with reference to the preferred embodiment thereof, it will be apparent to those skilled in the art that various modifications and variations can be made therein without departing from the spirit and scope of the invention.

What is claimed is:

1. A program guide data processing apparatus comprising:
    an SCID_filter section including a plurality of SCIDs for receiving A/V data provided in an A/V signal format;
    a frame_filter section, composed of a plurality of headers, for being mapped on the SCID-filter section in a multi-to-multi correspondence so that at least one of the headers corresponds to the plurality of SCIDs; and
    a memory section for forming a buffer for each of the SCIDs, and storing program guide data in the unit of a frame.

2. The apparatus as claimed in claim 1, wherein the respective header in the frame_filter section comprises:
    a frame_header section for representing an inherent value of the corresponding header;
    an SCID_number section having at least one SCID set in the respective frame_header section; and
    a mask section for selecting a mask of the corresponding header.

3. The apparatus as claimed in claim 2, wherein the SCID_number section represents an order set in the SCID_filter, that is a register number where the corresponding SCID is stored.

4. The apparatus as claimed in claim 1, wherein the memory section includes start and end address regions of the buffer where the program guide data is stored, a matched SCID_number section region, and a matched frame_header section region.

5. The apparatus as claimed in claim 4, wherein a size of the memory section is '(the maximum number of SCIDs corresponding to one header)*(the size of the buffer set by a user: the minimum value whereby the buffer is not in full)'.

6. The apparatus as claimed in claim 5, wherein when APG data is transmitted to the buffer, the SCID that matches the frame and the register number of the frame_header are also transmitted along with a frame_start_point, and a frame_end_point.

7. The apparatus as claimed in claim 1, wherein the respective SCID in the SCID_filter section comprises:
    an identifier (ID) for representing an inherent value of the corresponding SCID; and
    a bit map that matches at least one frame_header.

* * * * *